(12) United States Patent
Kim

(10) Patent No.: US 10,661,828 B2
(45) Date of Patent: May 26, 2020

(54) SYSTEM AND METHOD FOR ESTIMATING STEERING TORQUE

(71) Applicants: Hyundai Motor Company, Seoul (KR); Kia Motors Corporation, Seoul (KR)

(72) Inventor: Chan Jung Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 266 days.

(21) Appl. No.: 15/799,717

(22) Filed: Oct. 31, 2017

(65) Prior Publication Data

US 2018/0297630 A1    Oct. 18, 2018

(30) Foreign Application Priority Data

Apr. 12, 2017   (KR) .................. 10-2017-0047193

(51) Int. Cl.
| | | |
|---|---|---|
| *B62D 5/04* | (2006.01) | |
| *B62D 6/00* | (2006.01) | |
| *B62D 3/12* | (2006.01) | |
| *B62D 6/10* | (2006.01) | |

(52) U.S. Cl.
CPC .............. *B62D 5/049* (2013.01); *B62D 3/12* (2013.01); *B62D 5/0463* (2013.01); *B62D 5/0481* (2013.01); *B62D 5/0484* (2013.01); *B62D 6/002* (2013.01); *B62D 6/10* (2013.01)

(58) Field of Classification Search
CPC .................................................... B62D 5/049
See application file for complete search history.

(56) References Cited

U.S. PATENT DOCUMENTS

| | | | | |
|---|---|---|---|---|
| 6,556,911 | B2* | 4/2003 | Matsuno ................. | B60T 8/172 |
| | | | | 180/422 |
| 8,150,582 | B2* | 4/2012 | Blommer ............... | B62D 6/008 |
| | | | | 180/446 |
| 8,788,147 | B2* | 7/2014 | Strecker ............... | B62D 5/0472 |
| | | | | 180/400 |
| 9,272,732 | B2* | 3/2016 | Greul ................. | B62D 15/0225 |
| 9,511,794 | B2* | 12/2016 | Hong ................... | B62D 5/0463 |
| 10,099,720 | B2* | 10/2018 | Ramanujam ......... | B62D 5/0463 |

(Continued)

FOREIGN PATENT DOCUMENTS

| | | |
|---|---|---|
| JP | 2003-175853 A | 6/2003 |
| JP | 2004-050972 A | 2/2004 |
| JP | 2009-051291 A | 3/2009 |

(Continued)

*Primary Examiner* — Todd M Melton
(74) *Attorney, Agent, or Firm* — Morgan, Lewis & Bockius LLP

(57) ABSTRACT

A system and a method for estimating a steering torque, may include receiving, in a controller, information including a value of a yaw rate and a value of a lateral acceleration of a vehicle collected in the vehicle in real time; determining and estimating, in the controller, a value of a rack force from the received information and a setting information using a predetermined model formula of estimating the rack force; and generating, in the controller, an estimated value of the steering torque according to an operation of a steering wheel of a driver from the estimated value of the rack force using a predetermined value of a gain.

13 Claims, 5 Drawing Sheets

(56) References Cited

U.S. PATENT DOCUMENTS 10,155,534 B2 * 12/2018 Varunjikar ............. B62D 5/049
2017/0072996 A1 * 3/2017 Hong ................... B62D 5/0463

FOREIGN PATENT DOCUMENTS

| JP | 2013-147174 A | 8/2013 |
| KR | 10-2015-0017798 A | 2/2015 |
| KR | 10-2016-0041350 A | 4/2016 |
| KR | 10-1639479 B1 | 7/2016 |

* cited by examiner

SYSTEM AND METHOD FOR ESTIMATING STEERING TORQUE

CROSS-REFERENCE(S) TO RELATED APPLICATIONS

The present application claims priority to Korean Patent Application No. 10-2017-0047193, filed on Apr. 12, 2017, the entire contents of which is incorporated herein for all purposes by this reference.

BACKGROUND OF THE INVENTION

Field of the Invention

The present invention relates to a system and a method for estimating a steering torque, and, more particularly, to a system and a method configured for exactly determining and estimating a value of a steering torque applied to a steering wheel by a driver upon failure or removal of a torque detector.

Description of Related Art

Generally, as a power assist steering system configured for reducing a steering torque of a driver upon steering of a vehicle, a Hydraulic Power Steering (HPS) system assisting a steering force of the driver using a hydraulic power generated by a hydraulic pump, and a Motor Driven Power Steering System (MDPS) system assisting a steering force of the driver using an output torque (assist torque) of an electric motor are known in the art.

Among the above, since the MDPS system may control an output of the electric motor configured for steering assist according to a driving condition of the vehicle when performing a steering assist function according to an operation of a steering wheel by the driver, the MDPS provides an improved steering performance and steering feeling than the Hydraulic Power Steering system.

Accordingly, the MDPS system, which may change and control a steering assist force generated by the output of the motor according to a driving condition, is being widely applied to recently released vehicles.

The MDPS system may be configured to include a plurality of detectors, including a steering angle detector configured for detecting a steering angle (column input angle) according to an operation of the steering wheel by the driver, a torque detector configured for detecting a steering torque (a steering wheel torque, a column torque) received through the steering wheel, a vehicle velocity detector configured for detecting a vehicle velocity, a wheel velocity detector, an engine rotation detector, a yaw detector and the like, a controller (MDPS ECU), and a steering motor (MDPS motor).

In the above configuration, the controller is configured to receive and obtain a steering input information related to the driver, including the steering angle, a steering angular velocity, the steering torque and the like, from the detectors and a vehicle status information, including the vehicle velocity, the wheel velocity, the engine rotation, the yaw rate and the like, to control an operation and an output of the steering motor.

Herein, the steering angle indicates a position of the steering wheel and the steering angular velocity may indicate a value of the angular velocity of the steering wheel which is obtained through a separate detector, or generated from a differential signal of a signal of the steering angle (a signal of the steering angle detector), and the steering torque indicates a torque applied to the steering wheel by the driver, that is, an input torque of the driver.

At the present time, the controller is configured to control an operating force (output) of the steering motor according to the vehicle velocity and generates a torque adjusted for steering assist (hereinafter, referred as to as 'assist torque'), and increases the output of the motor so that the driver may lightly operate the steering wheel at a low velocity and reduces the output of the motor so that the driver may heavily operate the steering wheel at a high velocity, thus obtaining a driving safety of the vehicle.

At a high velocity driving of the vehicle, since a risky situation may occur even by a slight operation of the steering wheel when the steering wheel is very light, there does not come a driving stability. Accordingly, a stable operation of the steering wheel may be achieved by changing a characteristic of the steering assist according to the vehicle velocity and assisting to allow the driver to more heavily operate the steering wheel at a high velocity driving state.

Generally, the output of the steering motor assisting the steering force of the driver is generated by controlling, in the controller, an electric current of the motor (amount of the electric current for assist control) applied to the steering motor.

At the present time, the controller is configured to determine, as tuned, an amount of the electric current corresponding to a value of the output (a value of the assist torque) which is determined based on information collected in the vehicle, that is, the steering input information related to the driver and the vehicle status information, and applies the determined value to the steering motor, and generates the assist torque, which is a force for assisting the steering force of the driver, through the operation of the motor.

In the above steering system, a configuration for delivering the steering force of the driver applied through the steering wheel and the steering assist force generated by the motor includes a steering column disposed on a lower portion of the steering wheel, a gear box converting a rotational force delivered from the steering column into a direct force and changing a direction of a tire, and a universal joint delivering the rotational force delivered to the steering column to the gear box.

Herein, the gear box includes a pinion gear receiving the rotational force from the universal joint and a rack bar with a rack engaging the pinion gear formed thereon, and the rack bar performs a direct motion from side to side by the rack upon rotation of the pinion gear.

At the present time, a force generated by the direct motion of the rack bar is delivered to the tire through a tire rod and a ball joint, and changes a direction of the tire.

Meanwhile, the MDPS system utilizes the steering torque (column torque) detected by the torque detector configured to control an operation and an output of the steering motor, and FIG. 1 is a view of generating a value of the assist torque using the steering torque detected by the torque detector for steering assist.

As shown in FIG. 1, the MDPS system generates the value of the assist torque using the steering torque detected by the torque detector and controls the operation of the motor using the generated value of the assist torque.

At the present time, the MDPS system controls an electric current applied to the motor, that is, the electric current of the motor, using the value of the assist torque and generates a steering assist force targeted (assist torque by the motor).

However, upon failure of the torque detector, as shown in FIG. 2, since the controller does not know a current torque, the controller may not determine the value of the assist torque. As a result, since the steering assist may not be performed, the driver suddenly loses the steering force while driving the vehicle and therefore may be in a risky situation.

Accordingly, it is necessary to estimate the value of the steering torque received through the steering wheel by the driver and perform an appropriate steering assist.

A method of analyzing or detecting an occurrence of abnormal of a signal or failure in the steering system and a fail-safe control method of controlling the steering system upon detection of failure are disclosed.

According to the related art, upon failure of a torque detector in a MDPS, as shown in FIG. 3, a method of estimating a steering torque using a steering angle and a motor rotation angle detected by detectors 1, 2 and generating a value of an assist torque using the estimated steering torque.

However, the above method estimates twist of a torsion bar from the steering angle and the motor rotation angle and estimates the steering torque, and in the method, an error may be largely occurred due to estimation of the twist of the torsion bar and it is not applicable to a type of DC motor that does not have a motor rotation angle detector 2.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method for estimating a steering torque configured for exactly determining and estimating a value of the steering torque applied to a steering wheel by a driver upon failure or removal of a torque detector.

Various aspects of the present invention are directed to providing a method of estimating a steering torque includes receiving, in a controller, information including a value of a yaw rate and a value of a lateral acceleration of a vehicle collected from the vehicle in real time; determining and estimating, in the controller, a value of a rack force from the received information and a setting information using a model formula of a predetermined model of estimating the rack force; and generating, in the controller, an estimated value of the steering torque according to an operation of a steering wheel of the driver from the estimated value of the rack force using a predetermined value of a gain.

The method of estimating the steering torque according to an exemplary embodiment of the present invention further includes performing a failure analysis on a torque detector that detects the steering torque according to a predetermined analysis logic, wherein the controller is configured to perform the estimating of the value of the rack force and the generating of the estimated value of the steering torque when determining failure of the torque detector through the failure analysis.

And, the generating of the estimated value of the steering torque may include generating, in the controller, a friction compensation torque from information related to a steering angular velocity or a motor angular velocity obtained through a detector; multiplying the estimated value of the rack force by the value of the gain and generating the value of the steering torque corresponding to the value of the rack force in the controller; and compensating the friction compensation torque with respect to the value of the steering torque generated by multiplying the value of the gain and generating the compensated value of the torque as the estimated value of the steering torque.

Furthermore, the method of estimating the steering torque may further include receiving, in the controller, information related to a steering angle and a motor rotation angle detected by a detector; generating, in the controller, the estimated value of the steering torque from the received information related to the steering angle and the motor rotation angle; and multiplying and summing the estimated value of the steering torque, which is generated from the value of the rack force, and the estimated value of the steering torque, which is generated from the steering angle and the motor rotation angle, by a weight factor determined by a current driving condition of the vehicle, respectively and generating a final estimated value of the steering torque.

Various aspects of the present invention are directed to providing a system for estimating a steering torque including a yaw rate detector configured for detecting a yaw rate of the vehicle; a lateral acceleration detector configured for detecting a lateral acceleration of the vehicle; and a first torque estimator generating an estimated value of a steering torque according to an operation of a steering wheel by the driver from information including values of the yaw rate and the lateral acceleration detected by the detectors, wherein the first torque estimator includes a rack force estimator configured for determining and estimating a value of a rack force from the values of the yaw rate and the lateral acceleration and a setting information using a model formula of a predetermined model of estimating the rack force; and a torque converter configured for multiplying the estimated value of the rack force by a predetermined value of a gain and converting the value of the rack force into the value of the steering torque corresponding to the multiplied value.

Herein, the first torque estimator may be configured to further include a friction estimator configured for generating a friction compensation torque from information related to a steering angular velocity or a motor angular velocity obtained through the detector; and a torque compensator configured for compensating the friction compensation torque received from the friction estimator with respect to the received value of the steering torque from the torque converter and generating the compensated value of the torque as the estimated value of the steering torque.

Furthermore, the system for estimating the steering torque may further include a steering angle detector configured for detecting a steering angle according to the operation of the steering wheel of the driver; a motor rotation angle detector configured for detecting a rotation angle of a steering motor; a second torque estimator configured for generating the estimated value of the steering torque from information related to the steering angle detected by the steering angle detector and the motor rotation angle detected by the motor rotation angle detector; and a weight generator configured for multiplying and summing the estimated value of the steering torque, which is detected in the first torque estimator, and the estimated value of the steering torque, which is detected in the second torque estimator, by a weight factor determined by a current driving condition of the vehicle, respectively and generating a final estimated value of the steering torque.

As a result, the system and method for estimating the steering torque according to an exemplary embodiment of the present invention has an effect configured for determining and estimating a more precise value of the steering torque than the method of estimating and determining the twist degree of the torsion bar from the steering angle and the motor rotation angle upon failure of the torque detector.

Furthermore, the present invention has an effect configured for a more precise estimation of the steering torque when applying a method of blending (summing the weight factor) the values estimated by the two methods above according to a vehicle driving condition, and configured for removing the torque detector.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
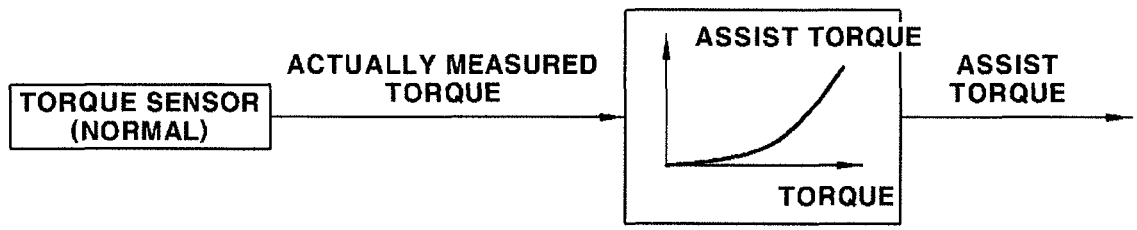
FIG. 1 is a view of generating a value of an assist torque upon a normal operation of a torque detector.
Figure 2:
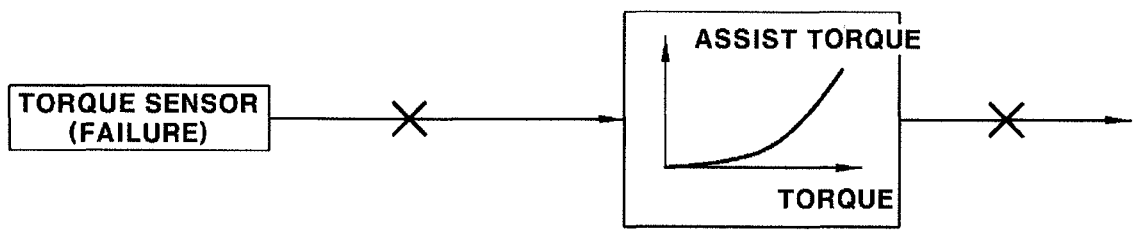
FIG. 2 is a view of not generating a value of an assist torque upon failure of the torque detector.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the whole description, it will be understood that when a component is referred to as being "comprising" any component, it does not exclude other components, but can further include the other components unless otherwise specified.

At first, for a better understanding of the present invention, a method of estimating a steering torque and generating a value of an assist torque according to a related art will be described with reference to the drawing.

Figure 3:
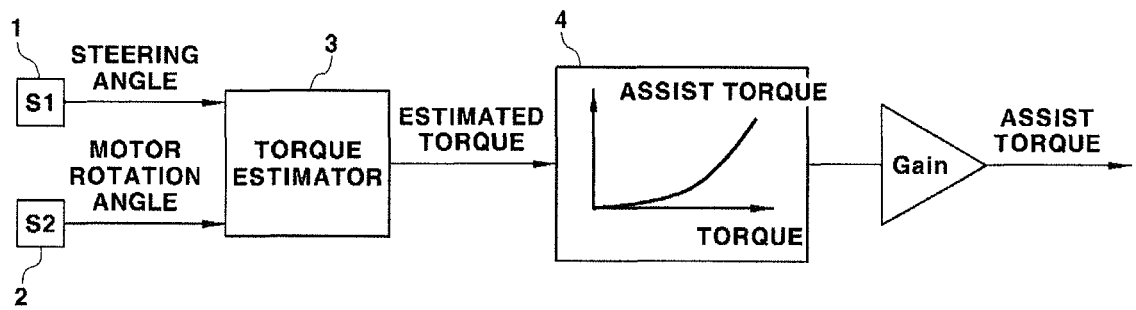
FIG. 3 is a view of estimating a torque and generating a value of an assist torque according to a related art.

FIG. 3 is a view illustrating a configuration of estimating a steering torque and generating an assist torque upon failure of a torque detector.

Referring to FIG. 3 a steering angle detected by a steering angle detector 1 and a motor rotation angle detected by a motor rotation angle detector 2 are input to a torque estimator 3.

Herein, the motor rotation angle detector 2 may become a resolver which is a detector configured for detecting a position of a motor, more specifically, a detector configured for detecting a position of absolute angle of a motor rotator, and the steering angle detector 1 indicates a known detector configured for detecting a steering angle according to an operation of a steering wheel of a driver.

The torque estimator 3, which receives a signal of the steering angle detector 1 and a signal of the motor rotation angle detector 2, estimates a steering torque based on the motor rotation angle and the steering angle indicating values of the signal of the two detectors, and as shown in Equation 1 below, determines and estimates the steering torque with a value, which multiplies a difference value of the steering angle and the motor rotation angle by a stiffness of a torsion bar being a well-known setting value.

$$\text{steering torque} = (\text{steering angle} - \text{motor rotation angle}) \times \text{stiffness of torsion bar} \quad \text{Equation 1}$$

Furthermore, the torque estimator 3 estimates the steering torque and outputs the estimated value of the steering torque, and then an assist torque generator 4 generates a value of an assist torque from the estimated value of the steering torque using a setting data (may be a map and the like).

Furthermore, since the generated value of the assist torque is determined by the estimated value of the steering torque, it is difficult to guarantee the value's reliability. Accordingly, a final value of the assist torque may be determined by multiplying the value of the assist torque by a predetermined value (which is less than 1) of a gain to use only a portion of the generated assist torque.

Herein, as described above, the method of estimating the steering torque using the motor rotation angle and the steering angle is defined as a second torque estimation method, and in various exemplary embodiments that will be described, a second torque estimator estimates the steering torque using the second torque estimation method.

The various exemplary embodiments will be described more specifically later

Meanwhile, various aspects of the present invention are directed to providing a method of estimating a steering torque upon failure of a torque detector, and include estimating the steering torque using information related to a yaw rate and a lateral acceleration of a vehicle which are values of signals of different detectors upon failure of the torque detector.

The present invention estimates a rack force using the information related to the yaw rate of a vehicle detected by a yaw rate detector and the information related to the lateral acceleration of the vehicle detected by a later acceleration detector, and estimates the steering torque from the estimated rack force.

Figure 4:
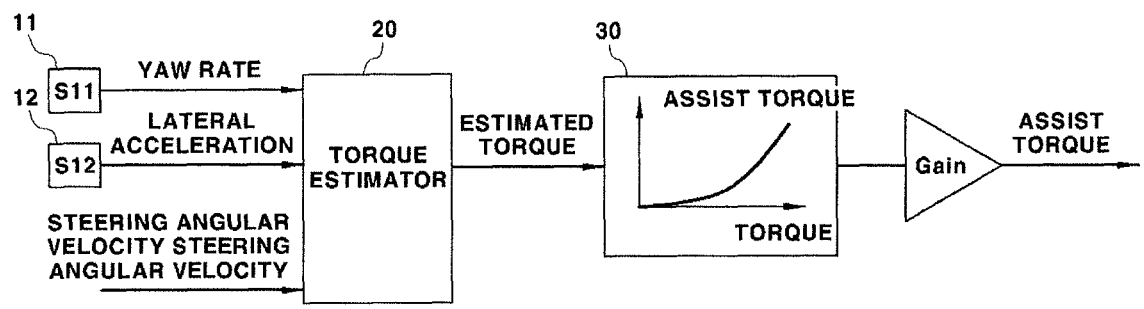
FIG. 4 is a view illustrating a configuration of a system for generating an assist torque using a method of estimating a steering torque according to various exemplary embodiments of the present invention.
Figure 5:
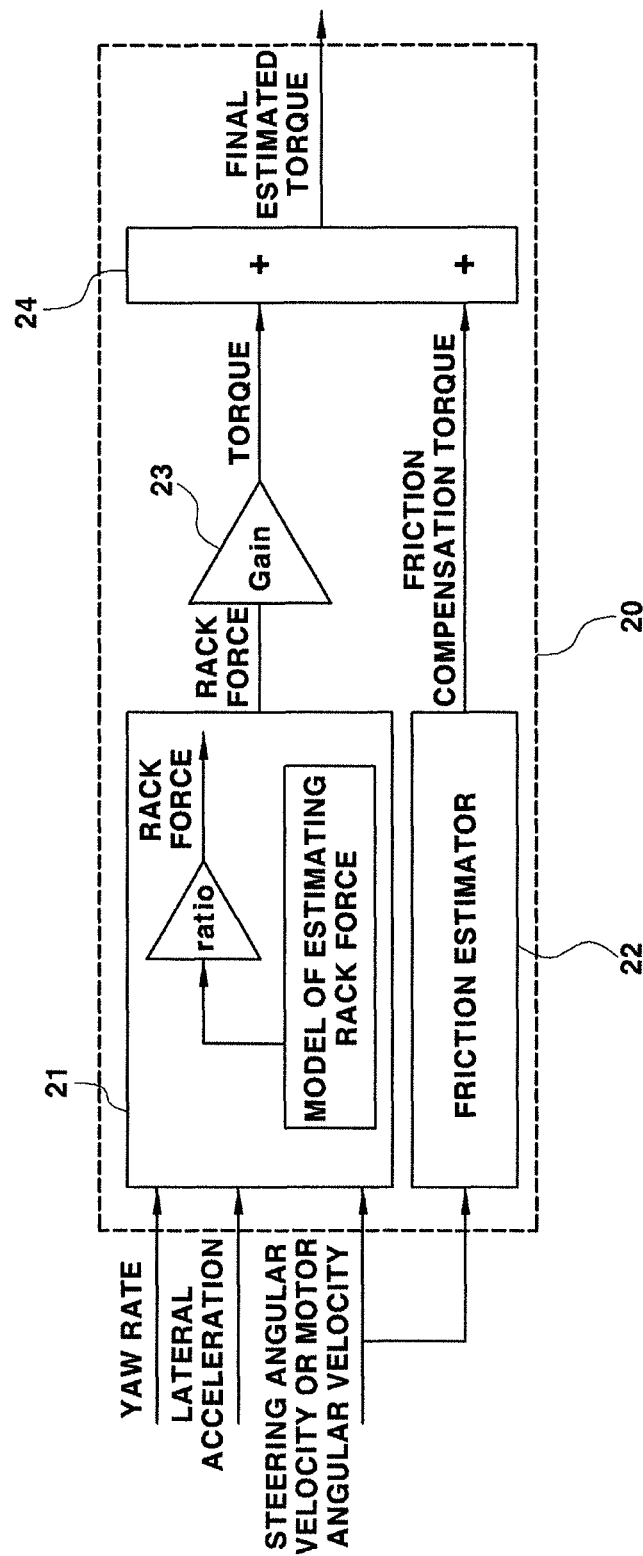
FIG. 5 is a view illustrating in detail the configuration of the system for estimating the steering torque according to the various exemplary embodiments of the present invention.

FIG. 4 is a view illustrating a configuration of generating an assist torque using a method of estimating a steering torque according to various exemplary embodiments of the present invention, and FIG. 5 is a view illustrating more specifically the configuration of estimating the steering torque according to the various exemplary embodiments of the present invention.

The configurations of FIG. 4 and FIG. 5 may be configured within a controller (for example, MDPS ECU), and configured to receive a vehicle status information and a steering information, which are collected in real time in the vehicle, as a detection information related to a detector and estimate a steering torque.

First, the controller is configured to perform a failure analysis of a torque detector according to a predetermined analysis logic, and the controller is configured to perform the estimating of the steering torque according to an exemplary embodiment of the present invention when determining failure of the torque detector through the failure analysis.

Furthermore, a yaw rate and a lateral acceleration of the vehicle detected by detectors 11, 12 as a vehicle status information for estimating the steering torque performed upon failure of the torque detector are input to a torque estimator 20 within the controller.

That is, a signal of the yaw rate detector 11 and a signal of the lateral acceleration detector 12 are input to the torque estimator 20, and the torque estimator 20 estimates the steering torque from a value of the yaw rate of the vehicle detected by the yaw rate detector 11 and a value of the lateral acceleration of the vehicle detected by the lateral acceleration detector 12.

Furthermore, information related to a steering angular velocity or a motor angular velocity may be used for estimating the steering torque in addition to the yaw raw and the lateral acceleration, and herein, the steering angular velocity and the motor angular velocity may also become information obtained from the signal of the detector.

The steering angular velocity may become a value of a rotation angular velocity of a steering wheel obtained through a separate detector or obtained from a differential signal of the steering angle signal which is a signal of the steering angle detector (as not shown in FIG. 4 and a reference numeral 1 in FIG. 3).

Furthermore, the motor angular velocity may become a value of a rotation angular velocity of a motor rotator obtained from a differential signal of a rotation angle signal which is a signal of the motor rotation angle detector (may become a resolver)(as not shown in FIG. 4 and a reference numeral 2 in FIG. 3).

As a result, the torque estimator 20 estimates the steering torque and outputs the value of the estimated steering torque, and an assist torque estimator 30 within the controller generates a value of an assist torque using a setting data (may be a map or the like) from the estimated value of the steering torque.

Furthermore, since the generated value of the assist torque is determined by the estimated value of the steering torque, it is difficult to guarantee its reliability. Accordingly, the controller is configured to multiply the value of the assist torque by a predetermined value (which is less than 1) of a gain and determines a final value of the assist torque to use only a portion of the generated assist torque.

As described above, when the value of the assist torque is generated, the controller is configured to control an operation of a motor using the generated value of the assist torque and at the present time, controls an electric current applied to the motor, that is, the electric current of the motor using the value of the assist torque, and generates a steering assist force (assist torque) targeted.

Referring to FIG. 5, the torque estimator 20 is configured to include a rack force estimator 21, a friction estimator 22, a torque converter 23, and a torque compensator 24.

At first, the rack force estimator 21 estimates a rack force from the yaw rate and the lateral acceleration of the vehicle detected by the detectors as the vehicle status information using a setting data.

Herein, the setting data may include a predetermined model of estimating the rack force, and the rack force estimator 21 determines and estimates the rack force from the yaw rate, the lateral acceleration, and an eigenvalue information related to the vehicle which is a well-known setting information using a model formula (which may be a model formula of a bicycle) of the model of estimating the rack force.

Herein, an exemplary embodiment of a formula for estimating the rack force will be described below.

Figure 6:
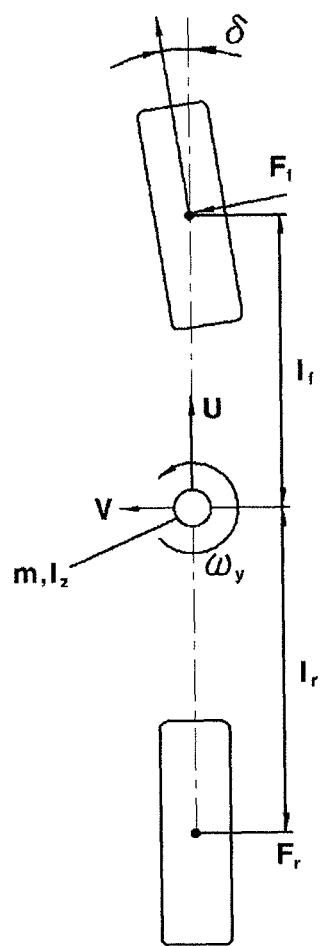
FIG. 6 is a view of explaining a model of estimating a rack force according to an exemplary embodiment of the present invention.

FIG. 6 is a view explaining the model of estimating the rack force, and a reference numeral δ indicates a wheel steering angle.

In the model of estimating the rack force, as shown in FIG. 6, an equation of a lateral force applied to a front wheel tire of the vehicle (hereinafter, referred as to 'front lateral force'), a lateral force applied to a rear wheel tire of the vehicle (hereinafter, referred as to 'rear lateral force'), and the lateral acceleration is shown in Equation 2 below.

$$F_f + F_r = m \times a_{lat} \qquad \text{Equation 2}$$

Herein, $F_f$ indicates a front lateral force and $F_r$ indicates a rear lateral force.

Furthermore, m indicates a vehicle mass which is an eigenvalue information and $a_{lat}$ indicates a lateral acceleration of the vehicle which is a detection information related to a detector.

Furthermore, an equation of a front lateral force, a rear lateral force, and a yaw rate is shown in FIG. 3 below.

$$l_f \times F_f - l_r \times F_r = I_z \times \dot{W}y \qquad \text{Equation 3}$$

Herein, $l_f$ indicates a distance between a center of gravity of the vehicle and a front wheel axis as an eigenvalue information related to the vehicle, and $l_r$ indicates a distance between the center of gravity of the vehicle and a rear wheel axis as an eigenvalue information related to the vehicle.

Furthermore, $I_z$ indicates a vehicle moment of inertia and $\dot{W}y$ indicates a yaw rate of a vehicle which is a detection information related to a detector.

In the Equations 2 and 3, m, $a_{lat}$ (a detected value of the detector), $l_f$, $l_r$, $I_z$, and $\dot{W}y$ (a detected value of the detector) indicate known values, and $F_f$ and $F_r$ indicate unknown values.

Accordingly, since the two equations, that is, the Equations 2 and 3 have two unknown values, $F_f$ may be obtained from $a_{lat}$ and $\dot{W}y$, which are a detected value of the detector, m, $l_f$, $l_r$, $I_z$.

As a result, a rack force may be determined by multiplying $F_f$ by a value of a predetermined ratio as an eigenvalue of the vehicle.

Accordingly, the rack force estimator 21 may determine and estimate the rack force from the yaw rate and the lateral acceleration of the vehicle detected by the detectors 11, 12 according to the above method.

Although the Equations 2 and 3 are provided as the above model formula, the model formula is only one exemplary embodiment and the present invention is not limited thereto. The steering angular velocity or the motor angular velocity, which is a steering information, obtained through the detector may be used according to a model formula in addition to the yaw rate and the lateral acceleration.

As described above, the rack force estimator 21 determines and estimates the rack force and outputs the estimated value of the rack force, and the rack force estimator 21 generates the value of the steering torque corresponding to the estimated value of the rack force.

At the present time, the torque converter 23 multiplies the rack force by the value of the gain for converting the rack force into a torque of the steering pinion gear and generates the value of the steering torque from the value multiplying the rack force by the value of the gain.

Herein, the value of the gain may be, as a predetermined value, as shown in Equation 4, determined by a caster trail of a front wheel, a pneumatic trail of the front wheel tire, a moment arm, and a radius of the steering pinion gear, which are eigenvalues of the vehicle.

$$\text{Gain} = (\text{caster trail} + \text{pneumatic trail})/\text{moment arm} \times \text{radius of pinion gear} \qquad \text{Equation 4}$$

And, it is preferable to compensate a friction compensation torque with respect to the value of the steering torque, which multiplies and determines the rack force by the value of the gain, and determines the compensated value of the torque as a final estimated value of the steering torque.

Accordingly, the torque estimator 20 may further include a friction estimator 22 determining and estimating the friction compensation torque from the steering information obtained through the detector and the setting information, and the steering information for determining the friction compensation torque may include a steering angular velocity or a motor angular velocity.

As described above, since the method of determining and estimating the friction compensation torque using the steering information and the setting information obtained in the vehicle is a known technology already applied to a steering control of a vehicle, a detailed description thereof will be omitted herein.

As a result, the torque compensator 24 receives the value of the steering torque determined and output in the torque converter 23 and the friction compensation torque estimated and output in the friction estimator 22, and compensates the friction compensation torque with respect to the value of the steering torque and generates the compensated value of the torque, and therefore the value of the compensated torque, which is compensated and output in the torque compensator 24, becomes the estimated value of the steering torque.

Accordingly, the value of the assist torque may be generated using the final estimated value of the steering torque in the torque estimator 20 in FIG. 4 and FIG. 5.

Figure 7:
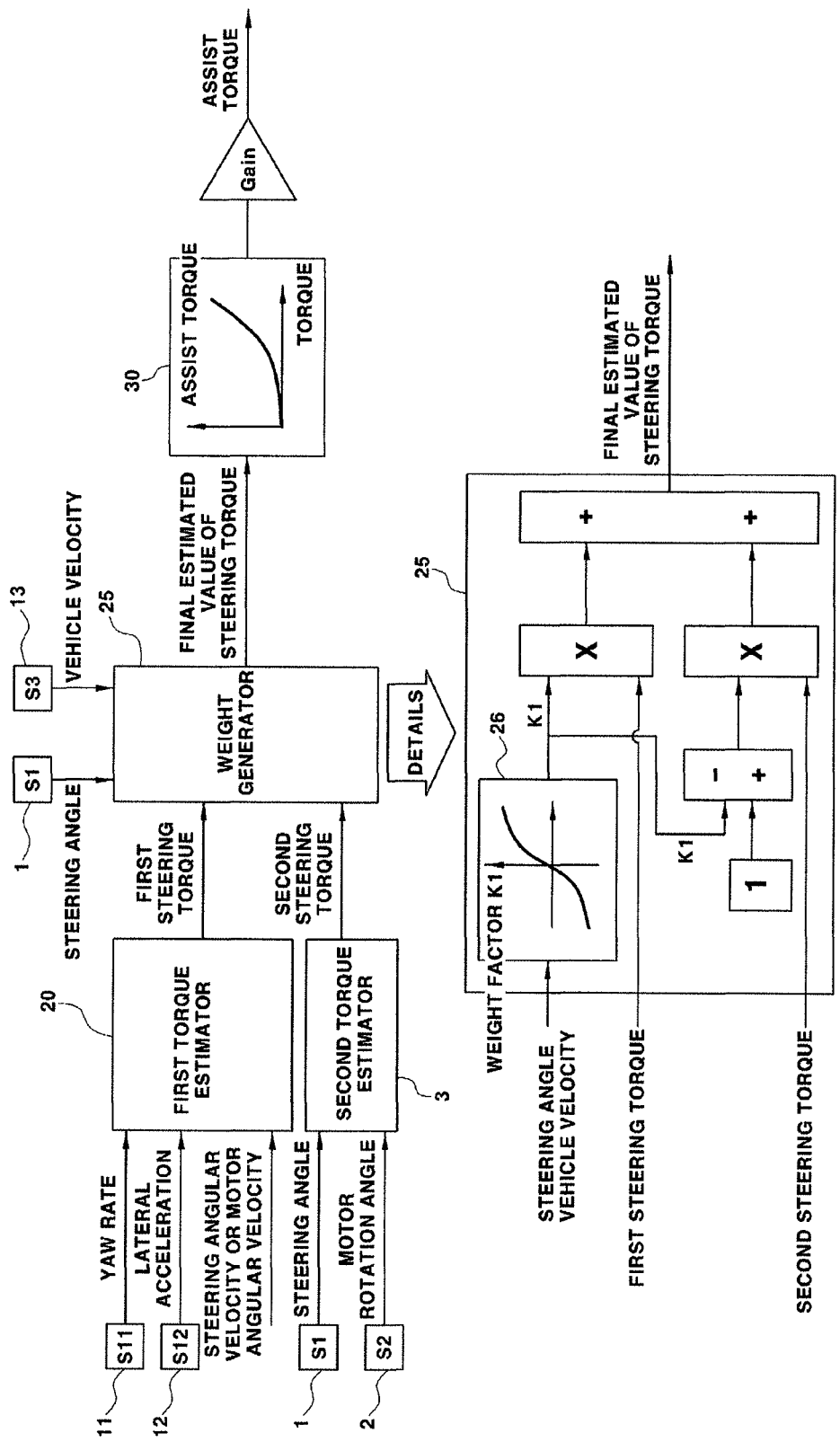
FIG. 7 is a view of estimating a steering torque and generating an assist torque using the estimated value of the steering torque according to various exemplary embodiments of the present invention.

Next, FIG. 7 is a view illustrating a configuration of estimating a steering torque and generating an assist torque using the estimated value of the steering torque according to various exemplary embodiments of the present invention.

A method of estimating the steering torque described with reference to FIG. 4 and FIG. 5 is defined as a first steering estimation method, and in the various exemplary embodiments shown in FIG. 7, a final steering torque is generated using a method of applying and summing a weight factor to the estimated value of the steering torque in the first torque estimation method and the estimated value of the steering torque in the second torque estimation method, respectively.

Herein, as described above, the second torque estimation method may be a method of estimating the steering torque from the steering angle detected by the steering detector 1 and the motor rotation angle detected by the motor rotation angle detector 2.

Hereinafter, in an exemplary embodiment of the present invention, the steering torque estimated by the first torque estimation method is called a first steering torque and the steering torque estimated by the second torque estimation method is called a second steering torque.

The first and second steering torques indicate the estimated values.

Accordingly, a system for estimating a steering torque within a controller may be configured to include a first torque estimator 20 estimating a first steering torque from a yaw rate and a lateral acceleration of a vehicle, which are information obtained through the detectors 11, 12, and a steering angular velocity or a motor angular velocity of the vehicle using the first torque estimation method; a second torque estimator 3 estimating a second steering torque using the second torque estimation method from the steering angle and the motor rotation angle, which are information obtained through the detectors 11, 12; and a weight generator 25 determining a weight factor from a current vehicle driving condition, applying and summing the determined weight factor to the first steering torque and the second steering torque and generating a final estimated value of the steering torque.

Herein, since the method of estimating the steering torque performed in the first torque estimator 20 and the second torque estimator 3, respectively, was described with reference to FIG. 3, FIG. 4, and FIG. 5, a further description thereon will be omitted.

The weight generator 25 includes a weight factor determining portion 26 determining the weight factor based on a current vehicle driving condition and the weight factor determining portion 26 determines the weight factor corresponding to the current vehicle driving condition.

Herein, the vehicle driving condition may be the steering angle detected by the steering angle detector 1 and a current driving velocity of the vehicle detected by a vehicle velocity detecting portion 13.

Equation 5 below shows a formula of determining the final estimated value of the steering torque from the first steering torque and the second steering torque using the above weighted-sum method, and weight factors K1 and K2 are predetermined as values less than 1, and K2 may become equal to 1−K1 (K2=1−K1).

$$\text{Final estimated value} = K1 \times \text{first steering torque} + K2 \times \text{second steering torque} = K1 \times \text{first steering torque} + (1-K1) \times \text{second steering torque} \qquad \text{Equation 5}$$

When the weight factor is K2=1−K1, the weight factor determining portion 26 utilizes a setting data, which is a predetermined weight factor K1, according to the steering angle and the vehicle velocity; and when the weight factor determining portion 26 determines the weight factor K1 according to a current steering angle and vehicle velocity, the weight generator 25 multiplies and sums the estimated value of the first steering torque in the first torque estimator 20 and the estimated value of the second steering torque in the second torque estimator 3 by the weight factor as shown in FIG. 5, respectively, and generates the final estimated value of the steering torque.

In the various exemplary embodiments of the present invention, since the estimated value of the second torque estimator 3 is a more precise value than that of the first torque estimator 20 at a low velocity of the vehicle, it is preferable to apply a larger weight factor to the estimated value in the second torque estimator 3 as a vehicle velocity decreases.

Accordingly, the weight factor K2 becomes larger as a vehicle velocity is lower, and therefore that the weight factor K2 is predetermined as a large value as a vehicle velocity decreases.

When the weight factor is determined as a formula of K2=1−K1, the weight factor K1 is a smaller value as a vehicle velocity is lower.

In the various exemplary embodiments, the weigh generator 25 generates and output the final estimated value of the steering torque and the assist torque generator 30 generates the value of the assist torque from the estimated value of the steering torque using the setting information (may be a map or the like).

Furthermore, the final value of the assist torque may be determined by multiplying the generated value of the assist torque by the predetermined value of the gain.

At the present time, the various exemplary embodiments estimates the torque using the two methods and thus may estimate a more accurate and precise value of the torque. To the present end, the value of the gain may be 1.

Furthermore, the various exemplary embodiments may more accurately estimate the steering torque, thus replacing the torque detector and not a fail-safe concept which estimates the torque on failure of the torque detector. As a result, it may be plausible to remove the torque detector, thus achieving the effect of cost savings.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of is the invention be defined by the Claims appended hereto and their equivalents.

What is claimed is:

1. A method of estimating a steering torque, the method comprising:
   receiving, in a controller, information including a value of a yaw rate and a value of a lateral acceleration of a vehicle collected in the vehicle in real time;
   performing a failure analysis on a torque detector configured to detect the steering torque according to a predetermined analysis logic;
   determining and estimating, in the controller, a value of a rack force from the received information and a setting information using a model formula of a predetermined model of estimating the rack force; and
   generating, in the controller, an estimated value of a steering torque according to an operation of a steering wheel by a driver from the estimated value of the rack force using a predetermined value of a gain,
   wherein the controller is configured to perform the estimating of the value of the rack force and the generating of the estimated value of the steering torque when determining a failure of the torque detector through the failure analysis.

2. The method of estimating the steering torque of claim 1, wherein the generating of the estimated value of the steering torque includes:
   generating, in the controller, a friction compensation torque from information related to a steering angular velocity or a motor angular velocity obtained through a detector;
   multiplying the estimated value of the rack force by the predetermined value of the gain and generating the value of the steering torque corresponding to the value of the rack force in the controller; and
   compensating the friction compensation torque with respect to the value of the steering torque generated by multiplying the predetermined value of the gain and generating the compensated value of the steering torque as the estimated value of the steering torque.

3. The method of estimating the steering torque of claim 1, wherein the received information further includes a steering angular velocity or a motor angular velocity.

4. The method of estimating the steering torque of claim 1, wherein the predetermined value of the gain is determined by a caster trail of a front wheel, a pneumatic trail of a front wheel tire, a moment arm, and a radius of a steering pinion gear, which are eigenvalue information related to the vehicle.

5. The method of estimating the steering torque of claim 1, further including:
   receiving, in the controller, information related to a steering angle and a motor rotation angle detected by a detector;
   generating, in the controller, the estimated value of the steering torque from the received information related to the steering angle and the motor rotation angle; and
   multiplying and summing the estimated value of the steering torque, which is generated from the value of the rack force, and the estimated value of the steering torque, which is generated from the steering angle and the motor rotation angle, by a weight factor determined by a current driving condition of the vehicle, respectively and generating a final estimated value of the steering torque.

6. The method of estimating the steering torque of claim 5, wherein the current driving condition of the vehicle indicates the steering angle and a vehicle velocity.

7. The method of estimating the steering torque of claim 6, wherein the weight factor, which is multiplied by the estimated value of the steering torque generated from the steering angle and the motor rotation angle, is set as a larger value as the vehicle velocity is lower.

8. A system for estimating a steering torque, the system comprising:

a yaw rate detector configured for detecting a yaw rate of a vehicle;

a lateral acceleration detector configured for detecting a lateral acceleration of the vehicle; and a first torque estimator configured for generating an estimated value of a steering torque according to an operation of a steering wheel of a driver from information including values of the yaw rate and the lateral acceleration detected by detectors, wherein the first torque estimator includes:

a rack force estimator configured for determining and estimating a value of a rack force from the values of the yaw rate and the lateral acceleration and a setting information using a model formula of a predetermined model of estimating the rack force;

a torque converter configured for multiplying the estimated value of the rack force by a predetermined value of a gain and converting the value of the rack force into the value of the steering torque corresponding to the multiplied value;

a friction estimator configured for generating a friction compensation torque from information related to a steering angular velocity of a motor angular velocity obtained through detectors; and a torque compensator configured for compensation the friction compensation torque received from the friction estimator with respect to the received value of the steering torque from the torque converter and generating the compensated value of the steering torque as the estimated value of the steering torque.

9. The system for estimating the steering torque of claim 8, wherein the information for generating the estimated value of the steering torque in the first torque estimator further includes the steering angular velocity or the motor angular velocity.

10. The system for estimating the steering torque of claim 8, wherein the predetermined value of the gain in the torque converter is determined by a caster trail of a front wheel, a pneumatic trail of a front wheel tire, a moment arm, and a radius of a steering pinion gear, which are eigenvalue information related to the vehicle.

11. The system for estimating the steering torque of claim 8, further including:

a steering angle detector configured for detecting a steering angle according to the operation of the steering wheel of the driver;

a motor rotation angle detector configured for detecting a rotation angle of a steering motor;

a second torque estimator configured for generating the estimated value of the steering torque from information related to the steering angle detected by the steering angle detector and the motor rotation angle detected by the motor rotation angle detector; and a weight generator configured for multiplying and summing the estimated value of the steering torque, which is detected in the first torque estimator, and the estimated value of the steering torque, which is detected in the second torque estimator, by a weight factor determined by a current driving condition of the vehicle, respectively and generating a final estimated value of the steering torque.

12. The system for estimating the steering torque of claim 11, wherein the current driving condition of the vehicle in the weight generator indicates the steering angle and a vehicle velocity.

13. The system for estimating the steering torque of claim 12, wherein the weight factor, which is multiplied by the estimated value of the steering torque in the second torque estimator, in the weight generator is set as a larger value as the vehicle velocity is lower.

* * * * *